June 17, 1930.  W. B. SMITH ET AL  1,764,359
SAFETY APPLIANCE FOR AIR BRAKE SYSTEMS
Filed Feb. 15, 1930
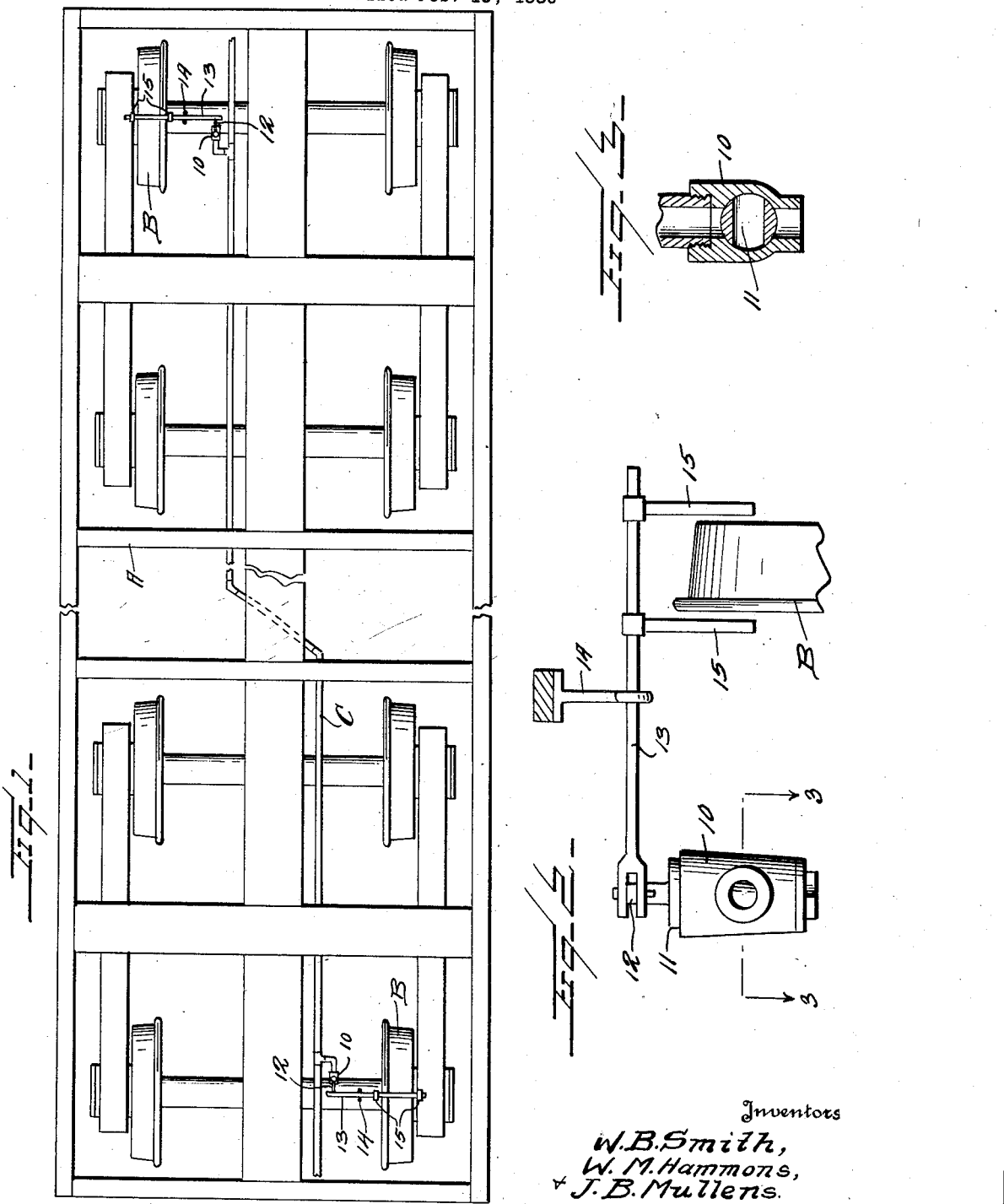
Inventors
W. B. Smith,
W. M. Hammons,
J. B. Mullens.
By Watson E. Coleman
Attorney Patented June 17, 1930

1,764,359

UNITED STATES PATENT OFFICE

WALTER B. SMITH, WILLIAM M. HAMMONS, AND JOHN B. MULLENS, OF CORBIN, KENTUCKY

SAFETY APPLIANCE FOR AIR-BRAKE SYSTEMS

Application filed February 15, 1930. Serial No. 428,694.

This invention relates to certain improvements upon the application of Walter B. Smith and William M. Hammons on safety brake appliance for railway trains, filed on the twenty-first day of September, 1929, in which mechanism was shown whereby the train line pipe of an air brake system could be vented to thus apply the brakes immediately and automatically when the train went off the track, this present invention showing an improvement over the construction which was shown in this prior application by the provision of means engaging over the rim of a car wheel, which is so constructed that if the wheel to which it is applied leaves the rail, the device will open the vent valve, allowing air to escape from the train line and apply the brakes, thus preventing bad wrecks and damage to the equipment.

Our invention is illustrated in the accompanying drawing, wherein:—

Figure 1 is an underside plan view of a railway car track showing our improvement applied thereto.

Figure 2 is an elevation of one of the car wheels, the vent valve and the valve actuating mechanism.

Figure 3 is a section of the vent valve.

Referring to these drawings, A designates the frame of a car, B the wheels thereof supported in the usual bearings and mounted upon the usual axles and C designates the train line pipe of the air brake system which if vented applies the brakes. We have shown this train line pipe as being provided with a valve casing 10 having therein an oscillatable valve 11 normally disposed so as to prevent any venting of the pipe and so constructed that when the valve is turned in either direction, the valve will be opened to vent the train line and apply the brakes. To this end the valve 11 has a stem to which is connected an arm 12. This arm 12 is connected to a rod 13 passing through an eye carried by a support 14 depending from the car frame, this rod 13 adjacent its extremity extending over the top of the car wheel B and being provided with the two depending lugs 15 disposed on each side of the wheel.

It will be obvious that under these circumstances any push or pull upon the rod 13 will cause the rotation of the valve 11 in one direction or the other and this will cause the venting of the train pipe. A vent valve 11 with its arm 12 and the rod 13 with the fork 15 may be used at both ends of a car and over one wheel or more so that if either one of the wheels or one of the trucks leaves the track, the lever connected to the fork embracing the wheel will push or pull the valve open, allowing air to escape from the train line and applying the brakes.

Any lateral movement of the wheel or of the truck carrying the wheel will, therefore, cause the immediate application of the brakes. We do not wish to be limited to the particular form of valve used, nor do we wish to be limited to the particular means of connecting this valve to the fork 15 as it will be obvious that many different connecting means might be used without departing from the spirit of the invention as defined in the appended claims.

The lever 13 will be supported on the frame of the car, but we do not wish to be limited to any particular means for supporting this lever or rod 13.

It is to be understood that we do not wish to be confined to any certain place of engagement between the connecting fork 15 and the wheel B as the connecting fork may be engaged with the wheel at a number of different points as found suitable. Our invention is designed to be used on all freight cars, passenger coaches and locomotives, but under these circumstances, of course, different connections will have to be made to the train lines as all train lines are not located in the same place, nor are they equipped in exactly the same manner. Therefore, it is obvious that the connections to the train line might be modified in many ways without departing from the spirit of the invention as defined in the appended claims.

We claim:—

1. The combination with a car having a truck, a car wheel and an air brake system including a train pipe, of a valve for venting the train pipe upon a movement of the valve from a normal train pipe closing position in either direction to a venting position, and means embracing the wheel and operatively connected to the valve to cause the valve to shift to its venting position when the wheel moves laterally in either direction, said means being mounted upon the car and being independent of the truck or wheel.

2. In a car having a body, a truck and a wheel and an air brake system including a train pipe, of a vent valve disposed in the train pipe, and movable in either direction from a closed to a venting position, and means for automatically opening said valve when the wheel leaves the rail comprising a fork embracing the wheel and supported upon the car body independently of the wheel and truck and operatively connected to the valve.

3. In a car having a body, a truck and a wheel and having an air brake system including a vent pipe, a valve normally closing the vent pipe but shiftable in either direction to vent the train line, the valve having a handle and disposed inward of the car wheel, and a rigid rod connected to said handle and supported on the car body independently of the truck and wheel and extending transversely of the axis of the car wheel and having a fork embracing the car wheel.

In testimony whereof we hereunto affix our signatures.

WALTER B. SMITH.
WILLIAM M. HAMMONS.
JOHN B. MULLENS.